(12) United States Patent
Warwick et al.

(10) Patent No.: US 7,421,711 B2
(45) Date of Patent: Sep. 2, 2008

(54) SYSTEM, METHOD AND APPARATUS FOR SUPPORTING A KERNEL MODE DRIVER

(75) Inventors: Alan M Warwick, Bellevue, WA (US); Dilip C Naik, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 688 days.

(21) Appl. No.: 10/945,646

(22) Filed: Sep. 21, 2004

(65) Prior Publication Data
US 2005/0034135 A1 Feb. 10, 2005

Related U.S. Application Data

(63) Continuation of application No. 09/361,371, filed on Jul. 26, 1999, now abandoned.

(51) Int. Cl.
*G06F 13/00* (2006.01)
(52) U.S. Cl. .................... 719/326; 719/321; 719/327
(58) Field of Classification Search ............... 719/318, 719/321, 327, 326
See application file for complete search history.

(56) References Cited

U.S. PATENT DOCUMENTS

| | | | |
|---|---|---|---|
| 5,802,365 A | | 9/1998 | Kathail et al. |
| 5,889,990 A | | 3/1999 | Coleman et al. |
| 5,978,815 A | * | 11/1999 | Cabrera et al. ............... 707/204 |
| 6,049,842 A | * | 4/2000 | Garrett et al. .................. 710/33 |
| 6,233,624 B1 | * | 5/2001 | Hyder et al. ................. 719/327 |
| 6,334,162 B1 | * | 12/2001 | Garrett et al. ................. 710/54 |
| 6,370,591 B2 | * | 4/2002 | Kaihlaniemi ................. 719/321 |
| 6,385,663 B2 | * | 5/2002 | Senator ....................... 719/325 |
| 6,393,495 B1 | | 5/2002 | Flory et al. |
| 6,496,847 B1 | * | 12/2002 | Bugnion et al. ................. 718/1 |

* cited by examiner

*Primary Examiner*—Andy Ho
(74) *Attorney, Agent, or Firm*—Christensen O'Connor Johnson Kindness PLLC

(57) ABSTRACT

An invention is disclosed that provides a set of common software routines that may be accessed by device drivers in support of the Windows Management Instrumentation system. The set of common routines includes typical routines that would ordinarily be executed by device drivers designed in accordance with WMI. The common routines may reside in a library, dynamically accessible by the device drivers. When a device driver receives a message from the WMI system, the device driver may pass the message to the library to be handled in a common manner. In this manner, the developers of device drivers in accordance with the WMI system need only develop so much code as is necessary to support any unique features or data storage of its associated hardware. The result is shortened development time and fewer programming errors. In addition, the overall system performance may be improved because fewer instances of similar code are loaded in memory to support the WMI system.

22 Claims, 6 Drawing Sheets

SYSTEM, METHOD AND APPARATUS FOR SUPPORTING A KERNEL MODE DRIVER

CROSS-REFERENCE TO RELATED APPLICATION

This application is a continuation of application Ser. No. 09/361,371, filed Jul. 26, 1999, now abandoned, priority from the filing date of which is hereby claimed under 37 U.S.C. § 120.

FIELD OF THE INVENTION

The present invention generally relates to management instrumentation systems, and more specifically relates to computer systems having instrumented hardware devices.

BACKGROUND OF THE INVENTION

Background of WBEM

Corporations and other enterprises have a need to monitor the performance and status of elements of their computer networks to prevent data loss and to maximize resource efficiency. The computer industry is addressing that need by putting together the concept of Web-Based Enterprise Management ("WBEM"). WBEM is an industry initiative to develop a standardized, nonproprietary means for accessing and sharing management information in an enterprise network. The WBEM initiative is intended to solve the problem of collecting end-to-end management and diagnostic data in enterprise networks that may include hardware from multiple vendors, numerous protocols and operating systems, and a legion of distributed applications The founding companies of the WBEM initiative developed a prototype set of environment-independent specifications for how to describe and access any type of management instrumentation, including existing standards such as Simple Network Management Protocol and Desktop Management Interface. A core component of the specification is a standard data description mechanism known as the Common Information Model ("CIM"). The CIM specification describes the modeling language, naming, and mapping techniques used to collect and transfer information from data providers and other management models. The Windows Management Instrumentation ("WMI") system is a Windows-based implementation of the CIM specification and is fully compliant with the WBEM initiative.

One component of WMI is the Extensions to the Windows Driver Model ("WDM") provider (the "WMI provider") for kernel component instrumentation. The WMI provider interfaces with a kernel mode driver, coded in accordance with the Extensions to WDM specification, to pass WMI data between user mode and kernel mode. WMI uses the WMI provider to publish information, configure device settings, and supply event notification from device drivers.

Identification of the Problem

Although the WMI provider is a key component in making the WMI system work, it is not without disadvantages. First, manufacturers must add substantial additional code to their device drivers to support the WMI system. At present, each manufacturer must independently develop software methods and functions to incorporate in their device drivers to support the WMI Extensions to WDM specification. This creates a burden shared by every developer of device drivers intended to be used with the WMI system. It takes additional time for each developer to produce both the code specific to the developer's device, and the code specific to the WMI system. Second, because similar code is used in each device driver to support WMI, many instances of functionally-identical code are loaded in memory by the several drivers. The result is an inefficient operating state containing more system overhead than needed to support WMI. Overall system performance may suffer. Third, the likelihood of coding errors, or "bugs," is increased when many disparate vendors develop code to perform substantially the same function.

Accordingly, a need exists for a mechanism that allows disparate device drivers intended to interface with the WMI system to share code designed to operate with the WMI system.

SUMMARY OF THE INVENTION

The present invention addresses the above described needs and disadvantages by providing a set of common software routines that may be accessed by device drivers in support of the WMI system. The set of common routines includes typical routines that would ordinarily be executed by device drivers designed in accordance with WMI. The common routines may reside in a library, dynamically accessible by the device drivers. When a device driver receives a message from the WMI system, the device driver may pass the message to the library to be handled in a common manner. In this manner, the developers of device drivers in accordance with the WMI system need only develop so much code as is necessary to support any unique features or data storage of its associated hardware. The result is shortened development time and fewer programming errors. In addition, the overall system performance may be improved because fewer instances of similar code are loaded in memory to support the WMI system.

While the preferred implementation of the present invention provides a dynamically linked library, some driver standards, such as the Small Computer Systems Interface ("SCSI") miniport standard, do not allow for accessing code in a dynamically linked library. For those drivers, the library may be included as a static part of the driver at link-time. Although this solution may still result in multiple instances of the same code in memory, the development time is still shortened, and the typicality of the code results in a more stable WMI and Windows system. Also, the use of the library allows the underlying WMI infrastructure to be modified without affecting the developer's driver so long as the interface to the library is maintained.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a system and method for supporting a system of kernel mode device drivers that share common code by moving that common code to a software library. The present invention may be embodied in a management instrumentation system, such as the WMI system promoted by the Microsoft Corporation of Redmond, Washington.

Exemplary Operating Environment

Figure 1:
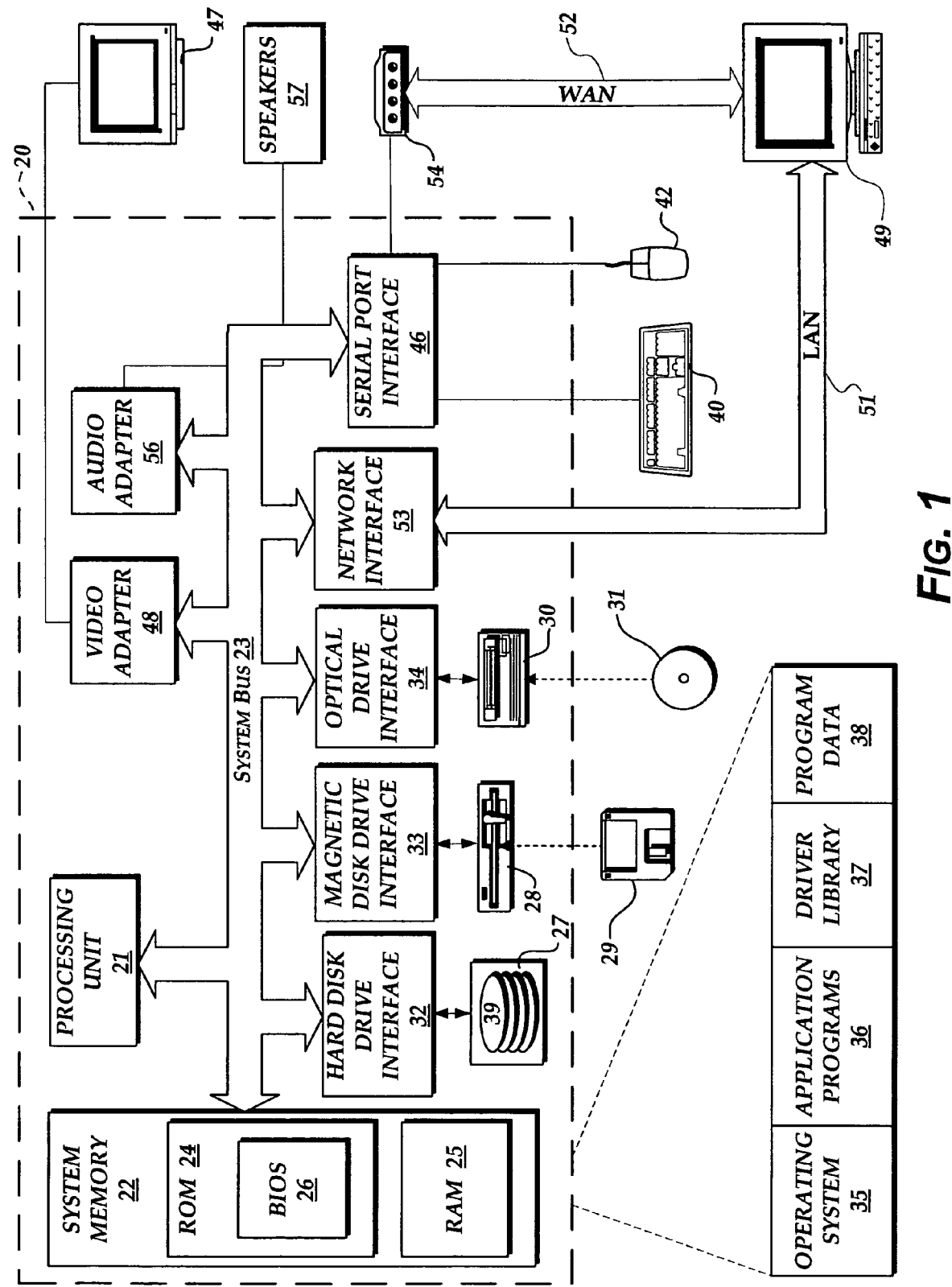
FIG. 1 is a functional block diagram of a computer suitable for providing an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The BIOS 26 may additionally store AML code for use in conjunction with an associated ACPI device. The personal computer 20 further includes a hard disk drive 27, e.g. to read from or write to a hard disk 39, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a driver library 37 constructed in accordance with one embodiment of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
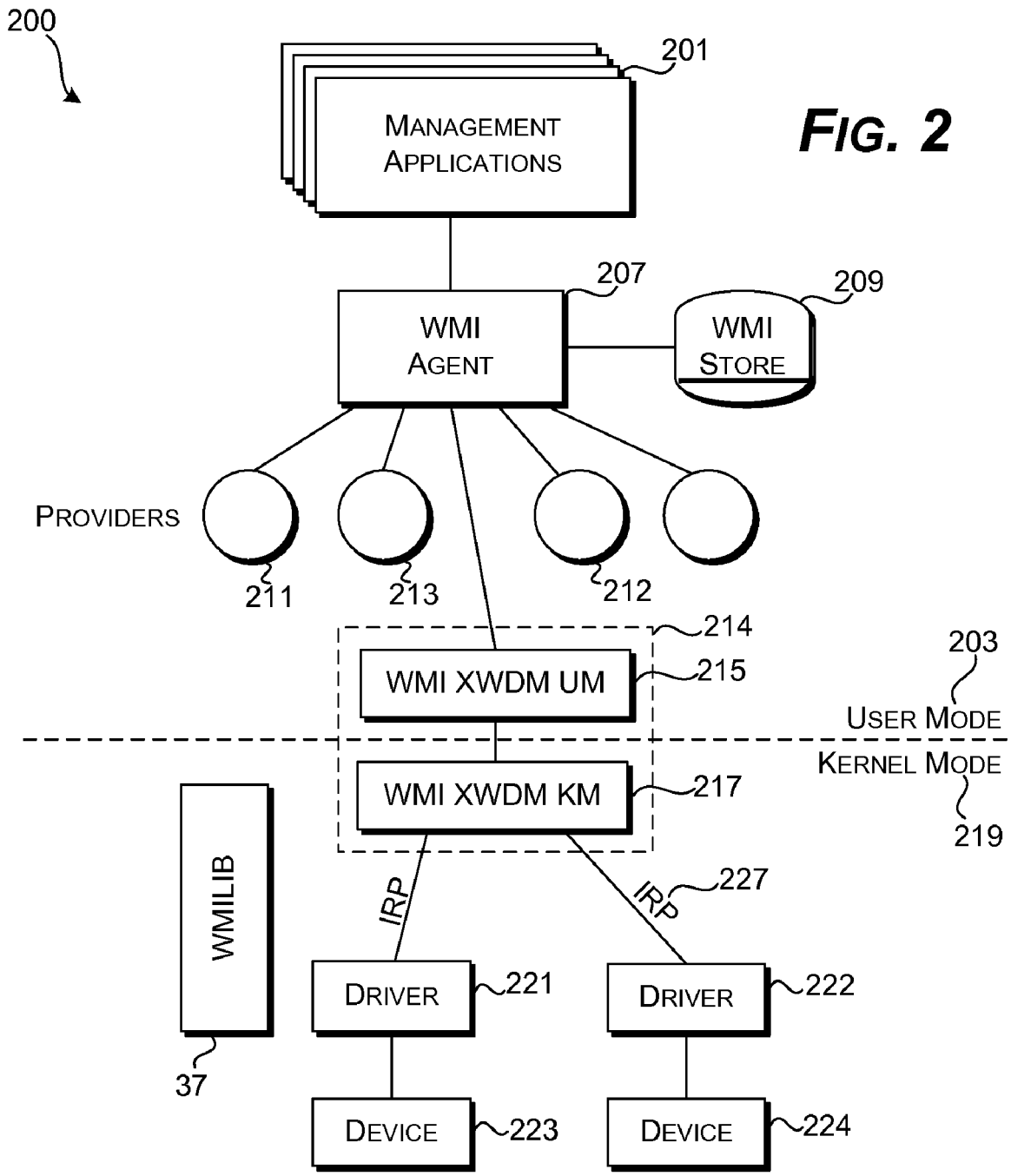
FIG. 2 is a functional block diagram of software components embodying the present invention resident on the computer system of FIG. 1.

FIG. 2 is a functional block diagram of software components embodying the present invention resident on the computer 20 of FIG. 1. Illustrated is a management system 200, including multiple management applications 201 executing in user mode 203. The management system 200 may be any CIM schema compliant management system, such as the WMI management system described above. Although embodiments of the present invention may be described here in cooperation with the WMI management system, the present invention is equally applicable to other management systems. Reference here to the WMI management system is for illustrative purposes only, and does not limit the applicability of the invention.

Interfacing with the management applications 201 is a WMI agent 207. The WMI agent 207 maintains and provides access to a WMI store 209, which is a database containing the management information exposed by the management system 200. The management information contained in the WMI store 209 comes from multiple providers, such as components 211, 212, and 213. The providers act as intermediaries between the WMI agent 207 and one or more managed objects. When the WMI agent 207 receives a request from a management application 201 for information that is not available from the WMI store 209, or for notification of events that are unsupported, the WMI agent 207 forwards the request to an appropriate provider. That provider then supplies the information or event notification requested.

One such provider is the WMI Extensions to Windows Driver Model ("XWDM") provider (the "WMI provider") 214. The WMI provider 214 includes two parts: a user mode component ("UM component") 215 and a kernel mode component ("KM component") 217. The UM component 215 communicates with the KM component 217 to pass messages between the user mode 203 and the kernel mode 219. The WMI provider 214 allows instrumented devices to make management information available to the management system 200, and hence management applications 201, by providing a pipeline between the user mode 203 and the kernel mode 219.

In kernel mode 219, several device drivers, such as driver 221 and driver 222, support their associated devices, such as device 223 and device 224, respectively, and pass information to the management system 200 via the WMI provider 214. The drivers operate in conjunction with the management system 200 to allow the management applications to query or set management information within the several instrumented devices. In addition to queries and sets, the management system allows WMI method calls, which are functionally equivalent to an I/O control ("IOCTL") call to a device.

The WMI provider 214 and the device drivers 221, 222 communicate by passing I/O Request Packets ("IRP") 227. The IRPs 227 are instructions to perform actions related to the operation of the management system 200. For instance, a particular IRP 227 may instruct the driver 221 to begin collecting data on its associated device 223. Another IRP 227 may instruct the driver 221 to end collecting that data. Several of the IRPs used by the WMI management system are detailed in the attached appendix, and are incorporated herein by reference for illustrative purposes only.

Also illustrated is a driver library 37 constructed in accordance with the present invention. The driver library 37, named "WMILIB" in this example, is a kernel mode software library that includes software routines that would ordinarily be included in each of multiple device drivers, such as both in driver 221 and driver 222. The kernel mode device drivers, such as driver 221, may call the driver library 37 to request that many routine functions be performed by the driver library 37 rather than by the individual device drivers. The driver library 37 may also call back to the kernel mode drivers and request certain device-specific information, performance or request a specific action. The interaction of the WMI provider 214, the kernel mode device drivers, and the driver library 37 is illustrated in FIG. 3 and described in detail below.

Figure 3:
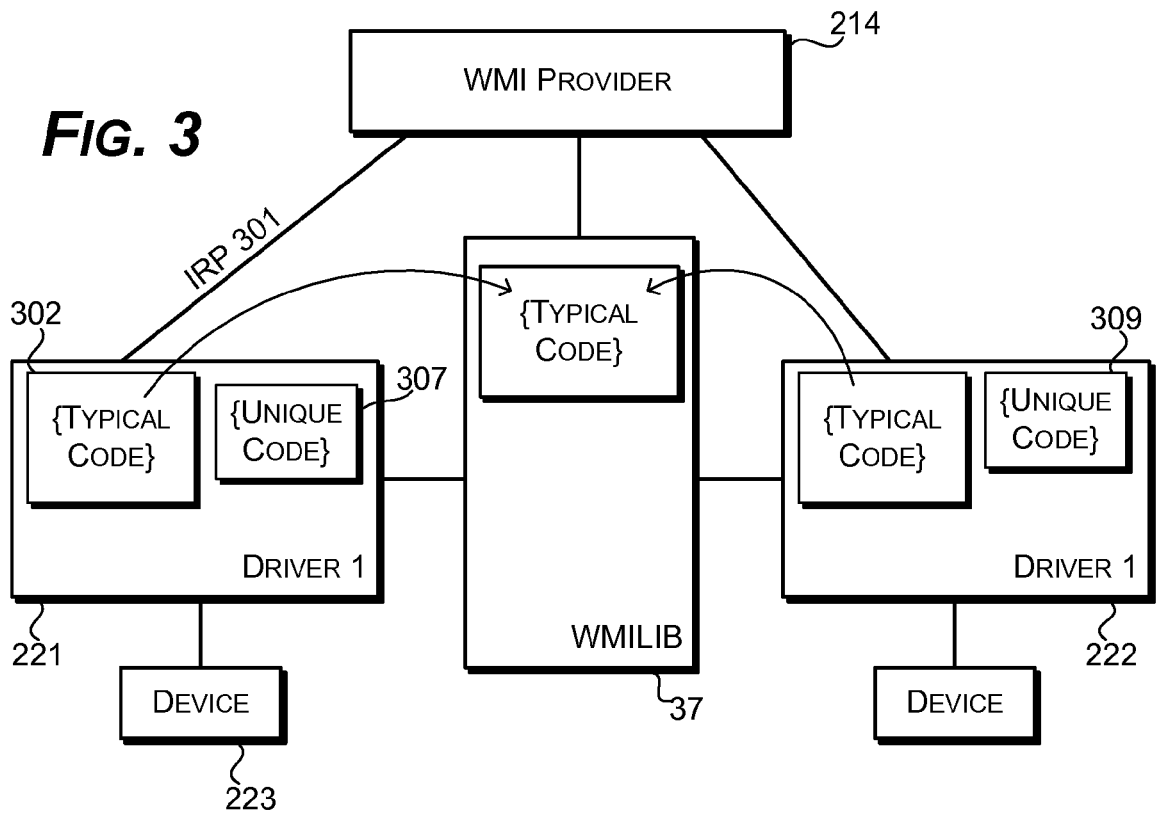
FIG. 3 is a functional block diagram illustrating the concept of moving typical code from multiple drivers to a common library in accordance with the present invention.

FIG. 3 is a functional block diagram illustrating in greater detail the interaction between the WMI provider 214, the kernel mode device drivers, and the driver library 37 to achieve the benefits of the present invention. To begin, the WMI provider 214 issues an IRP to a kernel mode device driver, such as IRP 301 to driver 221. IRP 301 may be an instruction to set data within the device 223 associated with the driver 221, it may be an instruction to retrieve data, or it may be an instruction for the driver 221 to cause the device 223 to perform some function. The code that would ordinarily handle the IRP 301 is typical code 302 that also resides in each of several other kernel mode device drivers, such as driver 222. However, in accordance with this embodiment of the invention, the typical code 302 actually resides in the driver library 37 rather than in the separate kernel mode device drivers. For that reason, rather than handle the IRP 301 directly, the driver 221 passes the IRP 301 to the driver library 37. The driver library 37 of this embodiment is accessible to the other drivers by way of several Application Programming Interface ("API") calls. Exemplary API calls used in connection with the WMI management system are described in detail in the attached appendix, and are incorporated herein by reference for illustrative purposes only.

In this manner, the driver library 37 may perform many functions that otherwise would be performed by the several kernel mode device drivers. However, the device drivers may also require some unique code, such as the unique code 307 associated with the driver 221 or the unique code 309 associated with the driver 222. It should be noted that unique code 307 is different from unique code 309. For example, unique code 307 may provide access to data registers or other features associated with the device 223, but which are inapplicable to another device, such as device 224. Consequently, each device driver maintains that software code necessary for interfacing to its associated device.

To handle the IRP 301, the driver library 37 may require access to the unique code 307, 309 maintained by the device drivers. For example, to handle the IRP 301, the driver library 37 may require access to data stored in a register on the device 223 itself. In that case, the driver library 37 may call back to the driver 221 to execute the unique code 307 and retrieve the requested data or perform an action. Exemplary callback routines used in connection with the WMI management system are described in detail in the attached appendix, and are incorporated herein by reference for illustrative purposes only.

Figure 4:
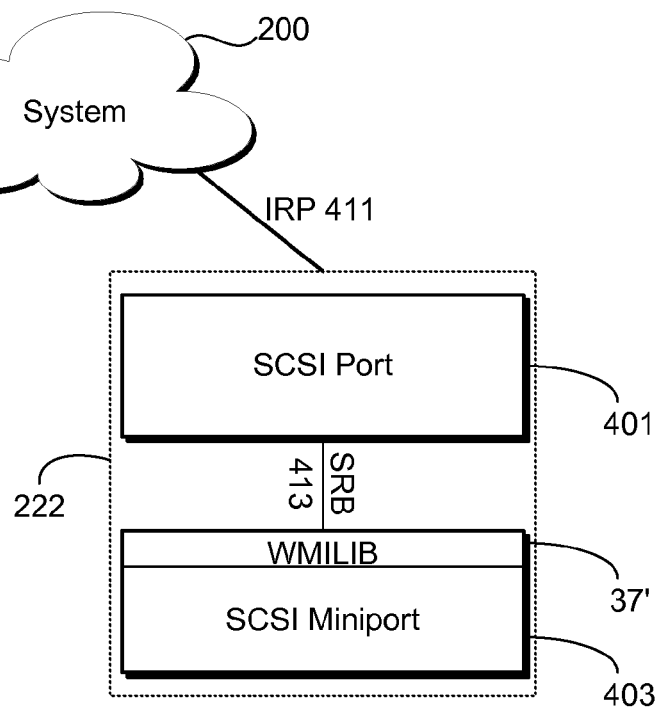
FIG. 4 is a functional block diagram illustrating the concept of a driver stack serviced by the common library of FIG. 3.

FIG. 4 is a functional block diagram illustrating an alternative embodiment of the present invention as it may be applied to a driver 222 that contains multiple drivers. In this embodiment, driver 222 is actually a driver stack, and includes more than one driver acting in concert to support the same device 224. One example of a driver stack may be a driver intended to interface with a SCSI device. Such a driver may employ both a SCSI port driver 401 and a SCSI miniport driver 403. The SCSI miniport driver 403 is a special kind of device driver designed to work in conjunction with the SCSI port driver 401 to support a SCSI device, such as device 224. The SCSI port driver 401 supplies the interface to the operating system 35 and some common code, while the SCSI miniport driver 403 contains any hardware specific code.

As is known to those skilled in the art, the SCSI miniport driver 403 cannot call code other than the SCSI port driver 401, and, for that reason, is unable to access the driver library 37 dynamically. Moreover, if the SCSI miniport driver 403 were modified to call the SCSI port driver 401 for functions similar to those provided by the driver library 37, then the SCSI miniport driver 403 would be unable to interface with earlier versions of the SCSI port driver 401. For those reasons, this embodiment of the invention provides a static driver library 37', rather than a dynamic library, that is incorporated into the SCSI miniport driver 403 at link time. The code from the driver library 37 is included in the SCSI miniport driver 403 as a static driver library 37', and the SCSI miniport driver 403 may directly access any necessary routines from the static driver library 37'.

As depicted in FIG. 4, the management system 200 issues to the driver 222 an IRP 411. The SCSI port driver 401 receives the IRP 411 and first determines whether the IRP 411 is intended for it. If the SCSI port driver 401 is intended to handle the IRP 411, then it does so. If not, then the SCSI port driver 401 translates the IRP 411 to a SCSI Request Block ("SRB") 413, which is a message format used with SCSI drivers, and passes the SRB 413 to the SCSI miniport driver 403. If the SRB 413 includes instructions that involve executing code related to the management system 200, the SCSI miniport driver 403 may call the static driver library 37' incorporated in the SCSI miniport driver 403. That configuration allows the SCSI miniport driver 403 to take advantage of the driver library 37 even though the SCSI miniport driver 403 cannot dynamically link to the driver library 37.

Figure 5:
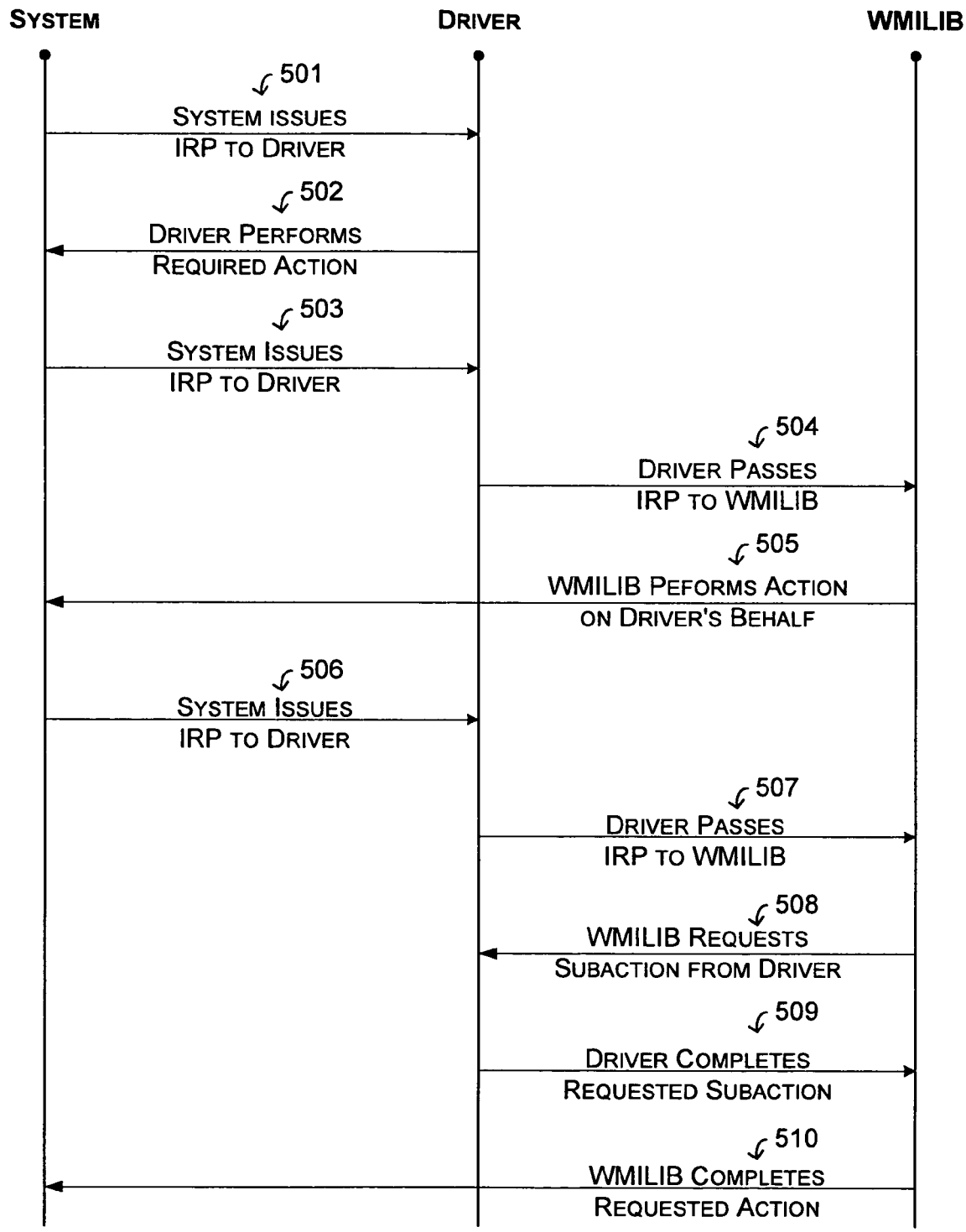
FIG. 5 is an event trace illustrating the flow of processing that occurs in a common library system in accordance with the present invention.

FIG. 5 is an event trace illustrating the management system 200 supporting a driver constructed in accordance with the present invention. The event trace begins at step 501 when the management system 200 issues an IRP to the driver 221. The first IRP may be a simple request for data or other action that the driver can handle directly. For example, the first IRP may be a simple request for data which the driver can handle directly. For instance, the driver may be a filter driver configured to intercept IRPs intended for another driver, and which handles those intercepted IRPs directly. The code in the driver 221 may not need assistance to handle that IRP, and consequently, at step 502, the driver 221 handles the IRP directly and performs the requested action. The driver 221 may also return any requested data to the management system 200.

At step 503, the management system 200 may issue a second IRP to the driver 221. Unlike the first IRP, the second IRP may require additional input beyond the scope of the code within the driver 221. In that case, at step 504, the driver 221 passes a message to the driver library 37 identifying the particular IRP. In this case, it is possible that the driver library 37 can handle the second IRP without further intervention by the driver 221, and consequently, at step 505, the driver library 37 performs the action requested by the IRP on behalf of the driver and without further assistance of the driver. For example, the driver library 37 may return any data requested by the management system 200. Alternatively, the return may be simply an indication that the IRP has been handled.

At step 506, the management system 200 issues a third IRP to the driver 221. As with the second IRP, the driver 221 does not handle the particular IRP. Accordingly, as with the second IRP, the driver 221 passes the IRP to the driver library 37. However, unlike the second IRP, to handle the third IRP, the driver library 37 requires some subaction from the driver 221. For example, the IRP may request data stored within the device 223 and which must be retrieved using unique code 307 within the driver 221. Accordingly, at step 508, the driver library 37 may issue a callback to the driver 221 requesting that it perform some subaction, such as retrieving the data stored on the device 223. At step 509, the driver 221 performs the requested subaction. For instance, the driver 221 may execute the unique code 307 to retrieve the requested data and return, at step 509, that data to the driver library 37. The driver library 37 may then format that data in a way that the management system 200 expects, and finally complete the requested action at step 510. In this example, completing the requested action may involve returning the retrieved data to the management system 200.

Figure 6:
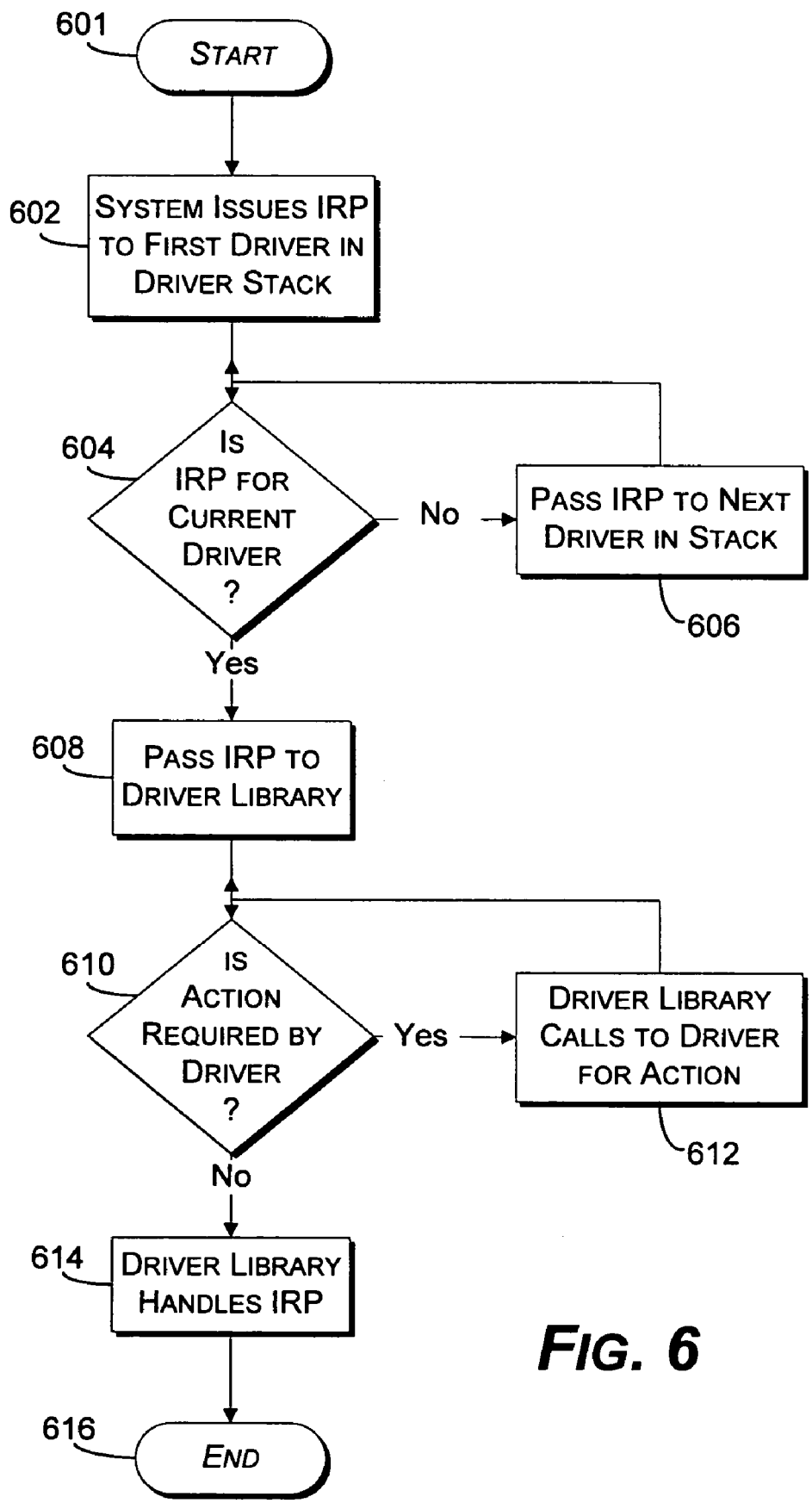
FIG. 6 is a logical flow diagram illustrating steps performed by a process for utilizing a common driver library in accordance with the present invention.

FIG. 6 is a logical flow diagram illustrating a process performed by one embodiment of the present invention to make use of the driver library 37 described above. The process begins at starting block 601, where the management system 200 begins to generate an instruction for a device driver, such as the driver 223. Processing continues at block 602.

At block 602, the management system 200 issues an IRP to the first driver in a driver stack. As mentioned above, a single device, such as device 223, may be serviced by a driver stack containing more than one device driver working in conjunction (called a "driver stack"). When an IRP is directed at information associated with a particular device, the IRP may actually be intended for a particular device driver in a driver stack, and should identify for which device driver in the stack the IRP is intended. Consequently, the management system 200 issues the IRP to the highest level driver (identified here as the first driver) in the driver stack, and processing continues at decision block 604

At decision block 604, the current driver identifies whether the IRP is intended for that driver. The current driver may make that determination by comparing an identifier stored in the IRP to an identifier associated with the driver. If the IRP is not intended for the current driver, processing proceeds to block 606 where the IRP is passed to the next driver in the stack and decision block 604 is repeated. It should be noted that there may be only a single driver in the stack, in which case the IRP should be intended for that driver. If the IRP is intended for the current driver, processing proceeds to block 608.

At block 608, after the intended driver has been determined, that driver may pass the IRP to the driver library 37. As discussed above, it is not necessary to the proper operation of the present invention that a driver pass all IRPs to the driver library 37. As discussed above, developers of device drivers may choose to include code in the driver to handle particular IRPs, while calling the driver library 37 for others. Therefore, at block 608, it is envisioned that any IRPs not chosen to be handled directly by the driver be passed to the driver library 37. Processing then proceeds to decision block 610.

At decision block 610, the driver library 37 identifies whether the particular IRP requires data from or further action by the calling driver. For example, if the IRP is a request for particular data only available through the driver, the driver library 37 may decide to call back to the driver for that information. At block 612, if any such information or input is required, the driver library 37 calls the driver for that information, and at decision block 610, the driver library 37 again determines whether further information is required. After receiving from the driver any additional information required to service the IRP, processing proceeds to block 614.

At block 614, the driver library 37 executes the routines necessary to service the particular IRP. Many varying routines and functions may be performed to handle the particular IRP. For example, an IRP may be issued requesting that data values be changed. However, if the driver does not support changing data values then the driver library 37 may return an error without the involvement of the driver. Another IRP may be issued requesting the driver library 37 to return all data associated with a driver, or a single instance of data associated with a particular device, such as device 223. As mentioned above, servicing the IRP may require actions from the driver in the form of data queries or sets related to the device. Likewise, the IRP may be a request to execute a method associated with data exposed by the driver. These examples are provided to illustrate the nature of the functionality of the driver library 37, and those skilled in the art will appreciate that many other functions and routines may be provided within the driver library 37. When the IRP has been handled, processing terminates at block 616.

Figure 7:
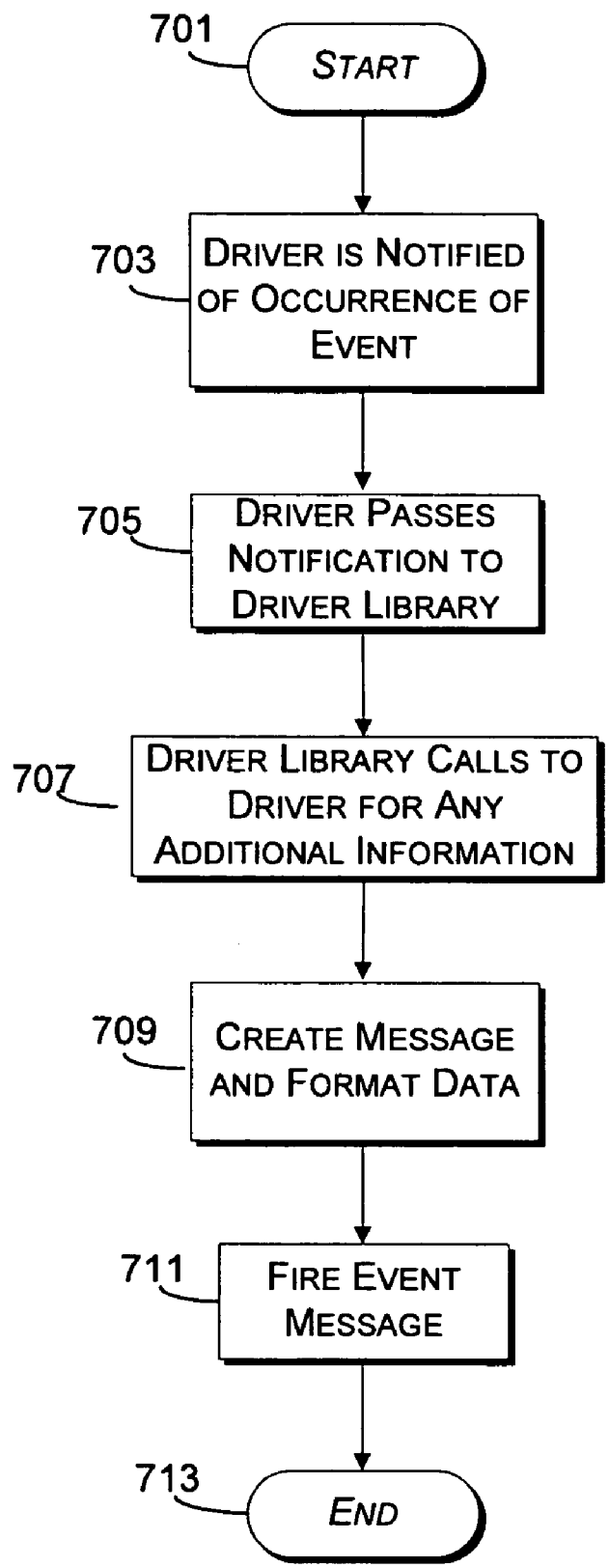
FIG. 7 is a logical flow diagram illustrating steps performed by a process for generating an event message through the use of a common driver library, in accordance with the present invention.

FIG. 7 is a logical flow diagram illustrating steps performed by a process for generating an event message through the use of driver library 37. The process begins at starting step 701, where an instrumented device 223 generates a notification that an event has occurred at the device 223. For example, if the device 223 is a temperature sensor, the event may be that the temperature of the computer 20 exceeds a given threshold. The process then continues at block 703.

At block 703, the device 223 issues a notification of the occurrence of the event to the driver 221. The notification of the event may take the form of an interrupt or other acceptable notification mechanism. Processing proceeds to block 705.

At block 705, the driver 221 passes to the driver library 37 the notification of the event with a request to handle that notification. For example, handling the event may include generating a properly-formatted message for issuance to the management system 200. In addition, handling the event may include retrieving from the device 223 certain data associated with the event. Accordingly, to simply the burden on the driver 221 of handling the event, common functions for data formatting and message generation may be stored within the driver library 37 and called to assist in handling the event. Processing continues at block 707.

At block 707, the driver library 37 may optionally call back to the driver 221 to retrieve any data associated with the event, such as a temperature value from a register within the device 223. The unique code 307 within the driver 221 may be invoked to retrieve and pass that data to the driver library 37. Any function provided by the unique code 307 may be invoked by the driver library 37. Processing continues at block 709.

At block 709, the driver library 37 may format any retrieved data in a buffer to be passed to the management system 200 along with an event notification message. For example, the management system 200 may expect data to be in a common format when passed with an event notification method. Code for constructing that common format may reside within the driver library 37, and therefore the data passed from the driver 221 may be raw, unformatted data. Processing continues at block 711.

At block 711, the driver library 37 issues to the management system 200 the event message constructed at block 709. Processing then terminates at ending block 713.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-readable medium having stored thereon computer-executable components, comprising:
    a device driver configured to provide information and perform actions associated with a hardware device; and
    a static driver library associated with the device driver, the static driver library containing software routines for making the information provided by and the actions performed by the device driver accessible to a device driver monitor and control management system that monitors information provided by and actions performed by the device driver and that issues messages to the device driver, the software routines of the library being accessible by the device driver to handle messages issued to the device driver by the device driver monitor and control management system, the static driver library being incorporated into a Small Computer System Interface (SCSI) miniport driver at link time such that the SCSI miniport driver can directly access the software routines of the static driver library.

2. The computer-readable medium of claim 1, wherein the device driver is further configured with a unique software routine particular to the device driver and related to the hardware device.

3. The computer-readable medium of claim 2, wherein the device driver is further configured to execute the unique software routine in response to a call from the driver library.

4. The computer-readable medium of claim 3, wherein the static driver library is further configured to call the unique software routine and cause the unique software routine to execute.

5. The computer-readable medium of claim 3, wherein the unique software routine is configured to retrieve data and perform actions associated with the hardware device.

6. The computer-readable medium of claim 3, wherein the unique software routine is configured to set a block of data stored on the hardware device.

7. The computer-readable medium of claim 3, wherein the unique software routine is configured to execute a method associated with the information associated with the hardware device, the method being operative to pass additional information between the device driver and the device driver monitor and control management system or perform a certain action.

8. The computer-readable medium of claim 7, wherein the static driver library contains a software routine to format the additional information in a format consistent with the device driver monitor and control management system.

9. The computer-readable medium of claim 1, wherein the static driver library is a dynamically accessible software library.

10. The computer-readable medium of claim 9, wherein the static driver library is further configured to receive, from the device driver, an identifier for a particular Input/Output Request Packet ("IRP"), and to execute a particular software routine related to handling the IRP.

11. The computer-readable medium of claim 1, wherein the static driver library is further configured to receive, from the device driver, an identifier for a particular IRP, to execute a particular software routine related to handling the IRP, and to return to the device driver monitor and control management system any information retrieved from the hardware device as a result of handling the IRP.

12. A computer-readable medium having stored thereon computer-executable instructions for providing management information to a device driver monitor and control management system that monitors information provided by and actions performed by a device driver and that issues messages to the device driver, which, when executed, comprise:
    receiving an input/output request packet ("IRP") message from the device driver monitor and control management system, the IRP message including instructions regarding data maintained by an instrumented hardware device;
    passing the IRP to a static driver library associated with the device driver, the static driver library containing software routines for handling the instructions of the IRP message, the static driver library being incorporated into a Small Computer System Interface (SCSI) miniport driver at link time such that the SCSI miniport driver can directly access the software routines of the static driver library; and
    handling the IRP message by the static driver library.

13. The computer-readable medium of claim 12, wherein passing the IRP to the static driver library comprises determining whether the IRP is intended for a particular device driver.

14. The computer-readable medium of claim 13, further comprising if the IRP is not intended for the particular device driver, passing the IRP to a next device driver in a driver stack.

15. The computer-readable medium of claim 12, wherein handling the IRP message by the static driver library comprises calling back to the device driver associated with the instrumented hardware device to request data from or perform an action by the device driver.

16. The computer-readable medium of claim 12, wherein handling the IRP message by the static driver library comprises calling back to the device driver associated with the instrumented hardware device to request that data be set at the instrumented hardware device.

17. The computer-readable medium of claim 12, wherein handling the IRP message by the static driver library comprises calling back to the device driver associated with the instrumented hardware device to cause a unique software routine within the device driver to be executed, the unique software routine being configured to perform a function related to the instrumented hardware device.

18. The computer-readable medium of claim 17, wherein the static driver library is further configured to format data received from the device driver in a format consistent with the device driver monitor and control management system.

19. A computing apparatus comprising a hardware device, a processor and a memory containing:
    a device driver configured to provide information and perform actions associated with a hardware device;
    a device driver monitor and control management system that monitors information provided by and actions performed by the device driver and that issues messages to the device driver; and
    a static driver library associated with the device driver, the static driver library containing software routines for making the information provided by and the actions performed by the device driver accessible to the driver monitor and control management system, the software routines library being accessible by the device driver to handle messages issued to the device driver by the device driver monitor and control management system, the static driver library being suitable for incorporation into a Small Computer System Interface (SCSI) miniport driver at link time such that the SCSI miniport driver can directly access the software routines of the driver library.

20. A computing apparatus comprising a hardware device, a processor and a memory, said memory storing a device driver monitor and control management system that monitors information provided by and actions performed by a device driver and that issues messages to the device driver, said computing apparatus operative to provide management information to the device driver monitor and control management system, by:
    receiving an input/output request packet ("IRP") message from the device driver monitor and control management system, the IRP message including instructions regarding data maintained by an instrumented hardware device;
    passing the IRP to a static driver library associated with the device driver, the static driver library containing software routines for handling the instructions of the IRP message, the static driver library being incorporated into a Small Computer System Interface (SCSI) miniport driver at a link time such that the SCSI miniport driver directly access the software routines of the driver library; and
    handling the IRP message by the driver library.

21. A computer-implemented method of providing management information to a device driver monitor and control management system that monitors information provided by and actions performed by a device driver and that issues messages to the device driver, comprising:
    configuring a device driver to provide information and perform actions associated with a hardware device;
    using a static driver library containing software routines for making the information provided by and the actions performed by the device driver accessible to a device driver monitor and control management system that monitors information provided by and actions performed by the device driver and that issues messages to the device driver, the static driver library being associated with the device driver, the static driver library being incorporated into a Small Computer System Interface (SCSI) miniport driver at a link time, the SCSI miniport driver directly accessing the software routines of the driver library; and
    making the information provided by and the actions performed by the device driver accessible to the device driver monitor and control management system, the static driver library being accessible by the device driver to handle messages issued to the device driver by the device driver monitor and control management system.

22. A computer-implemented method of providing management information to a device driver monitor and control management system that monitors information provided by and actions performed by a device driver and that issues messages to the device driver, comprising:
    receiving an input/output request packet ("IRP") message from the device driver monitor and control management system, the IRP message including instructions regarding data maintained by an instrumented hardware device;
    passing the IRP to a static driver library associated with the device driver, the static driver library containing software routines for handling the instructions of the IRP message, the static driver library being incorporated into a Small Computer System Interface (SCSI) miniport driver at a link time such that the SCSI miniport driver can directly access the software routines of the driver library; and
    handling the IRP message by the driver library.

* * * * *